United States Patent [19]

Miyazaki et al.

[11] Patent Number: 5,667,705
[45] Date of Patent: Sep. 16, 1997

[54] DISCHARGE CHAMBER AND METHOD OF MANUFACTURING THE SAME

[75] Inventors: Shigeki Miyazaki; Atsushi Seki, both of Kanagawa, Japan

[73] Assignee: Sony Corporation, Tokyo, Japan

[21] Appl. No.: 667,475

[22] Filed: Jun. 24, 1996

Related U.S. Application Data

[63] Continuation of Ser. No. 200,457, Feb. 23, 1994, abandoned.

[30] Foreign Application Priority Data

Feb. 24, 1993 [JP] Japan .................. 5-059667

[51] Int. Cl.$^6$ .................................................. B23K 10/00
[52] U.S. Cl. .................. 219/121.52; 219/121.59; 219/121.43; 345/60; 313/491; 349/143; 349/139
[58] Field of Search .............. 219/121.52, 121.48, 219/121.43, 121.4, 121.59; 156/646, 643; 359/54, 87; 345/60; 313/484, 491; 340/784

[56] References Cited

U.S. PATENT DOCUMENTS

| | | | |
|---|---|---|---|
| 5,102,510 | 4/1992 | Darian | 204/59 R |
| 5,298,748 | 3/1994 | Kenny et al. | 250/338.1 |
| 5,337,029 | 8/1994 | Lee et al. | 359/54 |
| 5,349,455 | 9/1994 | Hayashi et al. | 359/54 |
| 5,351,144 | 9/1994 | Tanamachi | 359/54 |

FOREIGN PATENT DOCUMENTS

| | | |
|---|---|---|
| 0500085 | 8/1992 | European Pat. Off. . |
| 4116859 | 11/1991 | Germany . |
| 42 11 258 | 5/1993 | Germany . |

*Primary Examiner*—Mark H. Paschall
*Attorney, Agent, or Firm*—Hill, Steadman & Simpson

[57] ABSTRACT

A discharge chamber wherein incomplete discharge arising from a discharge electrode surface condition is suppressed and a manufacturing method for the discharge chamber are disclosed. The discharge chamber includes a first substrate, a plurality of discharge electrodes formed on a surface of the first substrate by printing and baking, a second substrate adhered to the first substrate with a predetermined gap left therebetween, and ionizable gas enclosed in the gap. The discharge electrodes have clean surfaces from which insulating substances have been removed, and have a uniform composition in a horizontal direction and a depthwise direction. A plurality of barrier ribs are formed between the first and second substrates by printing and baking such that they overlap partially with the discharge electrodes. Insulating substances which make an obstacle to plasma discharge have been removed from exposed portions of the discharge electrodes at which the discharge electrodes are not covered with the barrier ribs.

9 Claims, 7 Drawing Sheets

DISCHARGE CHAMBER AND METHOD OF MANUFACTURING THE SAME

This is a continuation, of application Ser. No. 08/200,457, filed Feb. 23, 1994 now abandoned.

BACKGROUND OF THE INVENTION

1. Field of the Invention

This invention relates to a discharge chamber incorporated in a plasma addressed liquid crystal display device or a like device, and more particularly to a surface treatment technique for discharge electrodes of a discharge chamber.

2. Description of the Related Art

Figure 4:
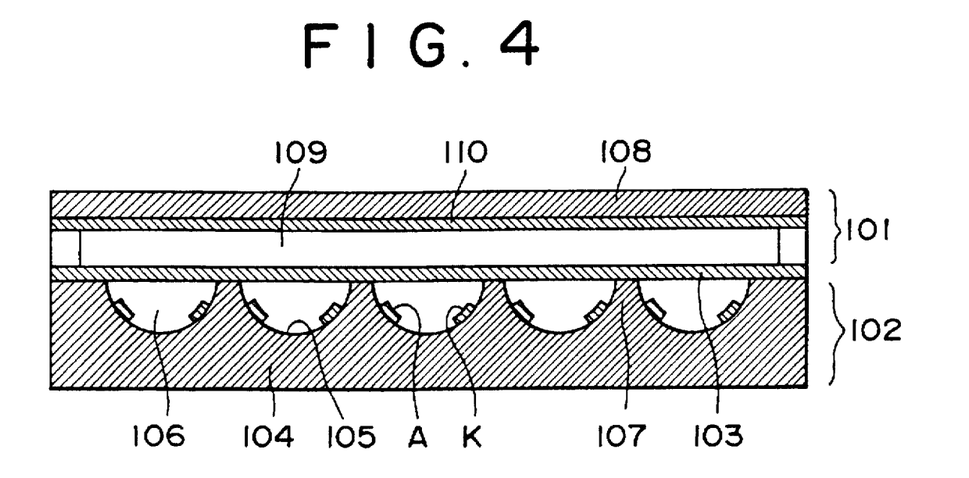
FIG. 4 is a schematic sectional view showing a conventional plasma addressed liquid crystal display device.

A plasma addressed liquid crystal display device in which a discharge chamber is used for addressing of a liquid crystal cell is already known and disclosed, for example, in U.S. Pat. No. 4,896,149 and Japanese Patent Laid-Open Application No. Heisei 1-217396 which corresponds to U.S. Pat. No. 5,077,553. Referring to FIG. 4, the plasma addressed liquid crystal display device shown has a layered flat panel structure which includes a liquid crystal cell 101, a discharge chamber 102 and a common intermediate substrate 103 interposed between the liquid crystal cell 101 and the discharge chamber 102. The discharge chamber 102 is formed using a glass substrate 104 and has a plurality of striped grooves 105 formed on a surface thereof. The grooves 105 extend, for example, in the direction along a row of a matrix. The grooves 105 are individually closed up by the intermediate substrate 103 to define spaces 106 which are individually separate from each other. Ionizable gas is enclosed in the thus closed up spaces 106. A rib 107 of the glass substrate 104 is disposed between each adjacent ones of the grooves 105 and serves as a barrier rib for isolating the adjacent spaces 106 from each other. A pair of parallel discharge electrodes are provided on a curved bottom surface of each of the grooves 105 and function as an anode A and a cathode K to ionize the gas in the corresponding space 106 to produce discharge plasma. Such discharge area makes a row scanning unit. Meanwhile, the liquid crystal cell 101 is constructed using a transparent substrate 108. The substrate 108 is disposed in an opposing relationship to the intermediate sheet 103 with a predetermined gap left therebetween, and a liquid crystal layer 109 is filled in the gap. A plurality of signal electrodes 110 are formed on an inner surface of the substrate 108. The signal electrodes 110 extend perpendicularly to the striped spaces 106 and make column driving units. Picture elements in a matrix are defined at intersecting positions between the column driving units and the row scanning units. In the display device having such a construction as described above, the striped spaces 106 in which plasma discharge occurs are selectively scanned in a line sequential condition while an image signal is applied to the signal electrodes 110 of the liquid crystal cell 101 in synchronism with such scanning to effect display driving of the display device. If plasma discharge occurs in a striped space 106, then the potential of the inside of the striped space 106 is put substantially uniformly to that of the anode A so that picture element selection of the row is performed. In other words, each of the striped spaces 106 functions as a sampling switch. If an image signal is applied to a picture element of a plasma sampling switch while the plasma sampling switch is in an on state, then sampling holding takes place so that lighting or extinction of the picture element can be controlled. Also after the plasma sampling switch is put into an off state, the image signal is held as it is in the picture element.

Figure 5:
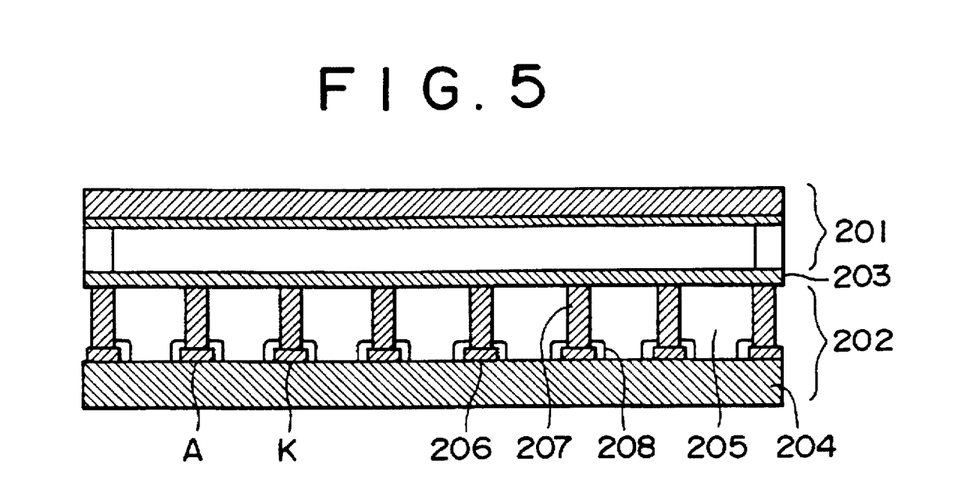
FIG. 5 is a similar view to FIG. 4 but showing another conventional plasma addressed liquid crystal display device.

Another plasma addressed liquid crystal display device which is improved in structure of a discharge chamber so that it is easy to manufacture and is suitably used to produce a screen of a large size and/or a high resolution is disclosed, for example, in Japanese Patent Laid-Open Application No. Heisei 4-265931, which corresponds to U.S. patent application Ser. No. 07/837,971 filed on Feb. 20, 1992 and assigned to the assignee of the present patent application. The improved display device is shown in FIG. 5. Referring to FIG. 5, also the improved display device has a flat panel structure wherein a liquid crystal cell 201 and a discharge chamber 202 are layered with each other with an intermediate sheet 203 interposed therebetween. The liquid crystal cell 201 has a basically same structure as the liquid crystal cell 101 shown in FIG. 4. Meanwhile, as for the discharge chamber 202, ionizable gas is enclosed between the intermediate sheet 203 and a lower side substrate 204 to form a closed up space 205. A plurality of striped discharge electrodes 206 are formed on an inner surface of the substrate 204. Since the discharge electrodes 206 can be formed on a flat substrate by screen printing or a like technique, the productivity and the operability are high and the discharge electrodes 206 can be formed finely. A barrier rib 207 is formed on each of the discharge electrodes 206, and the barrier ribs 207 divide the plasma chamber 205 into several discharge regions which make row scanning units. Also the barrier ribs 207 can be printed by screen printing or a like technique and based, and the top ends thereof contact with the lower surface of the intermediate sheet 203. The striped discharge electrodes 206 alternately function as an anode A and a cathode K and produce plasma discharge between them.

A problem to be solved by the present invention will be described briefly below with reference to FIG. 5. In manufacture of the discharge chamber 202, a conductive paste containing, for example, $Ni_2B$ as a principal component is used as the material of the discharge electrodes 206 while an insulating paste such as a glass paste is used as the material of the barrier ribs 207, and a process wherein the discharge electrodes 206 and the barrier ribs 207 are printed on the glass substrate and then baked is adopted. Conventionally, the barrier ribs 207 are printed and baked after the discharge electrodes 206 are printed and baked. Since a high temperature (about 600° C.) baking step is interposed between the two first and second printing steps, there is a problem to be solved in that the substrate 204 undergoes thermal deformation and consequently it is difficult to achieve accurate alignment between the discharge electrodes and the barrier ribs.

In order to cope with the problem, another process has been proposed wherein, after printing of discharge electrodes, they are provisionally baked at a comparatively low temperature and then barrier ribs are printed immediately, whereafter the discharge electrodes and the barrier ribs are baked simultaneously at a high temperature. However, the simultaneous baking method has another problem in that incomplete discharge occurs very frequently with a discharge chamber manufactured by the method. It is to be noted that, while the process described above wherein high temperature baking is performed twice does not cause the problem of frequent occurrence of such incomplete discharge, it has another disadvantage in that the plasma discharge is low in uniformity and stability with a discharge chamber manufactured by the method. In order to discover the causes of such incomplete discharge, a surface analysis of discharge electrodes has been conducted using an Auger electron spectroscopic method (AES), an X-ray photoelectron spectroscopic method (XPS) and so forth. The surface analysis proved that incomplete discharge is caused by an oxide insulating substance 208 such as $B_2O_3$ deposited on the surfaces of the discharge electrodes 206.

Figure 6:
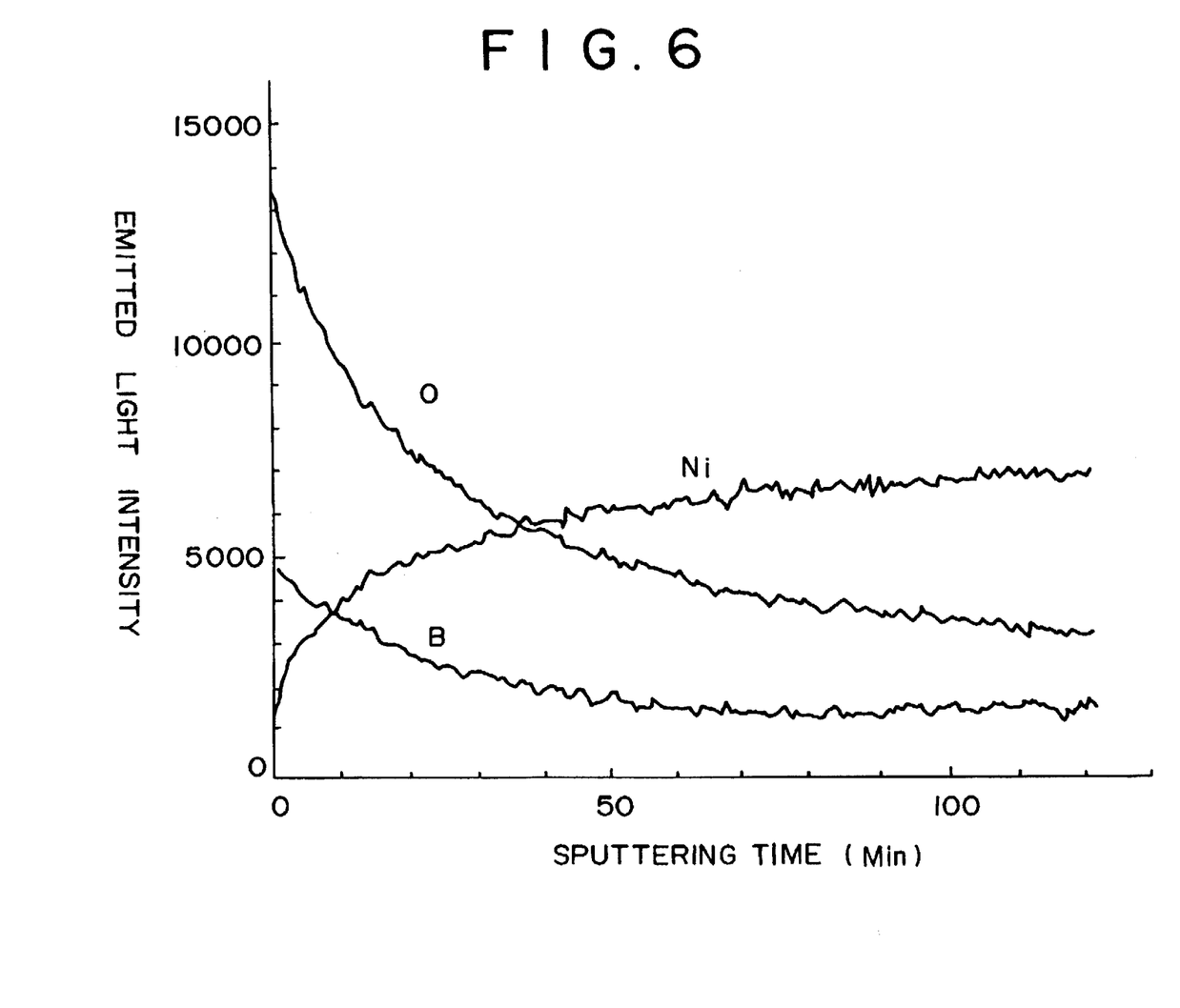
FIG. 6 is a graph showing an AES depth profile of a discharge electrode formed on a conventional discharge chamber.

For example, a result of measurement of a depth profile of a discharge electrode by the AES is shown in FIG. 6. The depth profile was obtained by measuring the intensity of emitted light while continuously sputtering the surface of the discharge electrode. The sputtering time on the axis of abscissa increases in proportion to the depth of the discharge electrode layer while the emitted light intensity on the axis of ordinate increases in proportion to the concentration of each component included in the composition of the discharge electrode. As described above, the discharge electrodes are made of a conductive material which contains $Ni_2B$ as a principal component. However, segregation occurs on the surfaces of the electrodes and the concentration of the metal component Ni which contributes to the conductivity is reduced compared with that in the insides of the electrodes while large quantities of insulating substances such as $B_2O_3$ are present on the surfaces of the electrodes. Particularly, the discharge electrodes are substantially covered with insulating substances within the range of several hundreds nm from the surfaces thereof. Consequently, even if a predetermined voltage is applied between an anode A and a cathode K of the discharge electrodes, effective plasma discharge does not occur.

SUMMARY OF THE INVENTION

It is an object of the present invention to provide a discharge chamber by which stable plasma discharge can be obtained and a method of manufacturing the discharge chamber.

In order to attain the object described above, according to an aspect of the present invention, there is provided a discharge chamber, which comprises first and second substrates arranged substantially in parallel to each other to define a space which is filed with an ionizable gas, and a plurality of printed discharge electrodes formed on a surface of the first substrate, each of the printed discharge electrodes having a purified surface from which impurities of insulating material are removed to have a flat depth profile. Preferably, the discharge chamber further comprises a plurality of printed barrier ribs formed on the printed discharge electrodes so that an exposed surface of the printed discharge electrodes has the purified surface. The purified surface of the discharge electrodes may be obtained by an etching procedure, and preferably, the etching procedure is a sputter etching. Alternatively, the purified surface of the discharge electrodes may be obtained by subjecting the electrode surface to an active gas plasma. Or, the purified surface of the discharge electrodes may be obtained by a mechanical working, and preferably, the mechanical working is a sand-blasting or polishing. Or else, the purified surface of the discharge electrodes may be obtained by a wet-etching procedure or by aging the discharge electrodes under an atmosphere of a formation gas. Otherwise, the purified surface of the discharge electrodes may be obtained by processing using at least one of hydrogen peroxide aqueous solution, ethylene glycol, or water.

With the discharge chamber, the surfaces of the discharge electrodes are clean and free from impurities of insulating substances as a result of purification processing performed therefor, and consequently, very uniform and stable plasma discharge can be obtained. Consequently, where the discharge chamber is incorporated, for example, in a plasma addressed liquid crystal display device or a like device, a high display quality can be obtained with the display device. Further, since insulating substances have been removed from the surfaces of the discharge electrodes, the discharge starting voltage of the discharge chamber can be reduced, and consequently, the discharge chamber can be driven readily. Further, simultaneous baking of the discharge electrodes and the barrier ribs is allowed. While three steps of high temperature heat treatment including heating for pre-processing of a substrate itself are required where high temperature baking is performed separately for the discharge electrodes and the barrier ribs as in manufacture of a conventional discharge chamber, according to the present invention, only one step of high temperature heat treatment is required, and consequently, the efficiency in manufacture is improved. Further, comparing with the case wherein high temperature baking is performed separately for the discharge electrodes and the barrier ribs, the amount of an out-of-alignment condition between the discharge electrodes and the barrier ribs is reduced, and consequently, the yield of production is improved and the display quality is improved. In addition, initial stage aging for stabilization after assembly of a discharge chamber becomes unnecessary, which improves the efficiency in manufacture. Furthermore, as a result of removal of insulating substances, the offset between the anode potential and the plasma potential is reduced, and consequently, the display quality is improved.

According to another aspect of the present invention, the discharge chamber can be manufactured by a method of manufacturing a discharge chamber which comprises first and second substrates defining therebetween a space filled with an ionizable gas, which comprises the steps of forming a plurality of discharge electrodes on a surface of a substrate by a printing procedure, baking the discharge electrodes, purifying a surface of the discharge electrodes by removing impurities of insulating material from the electrode surface, and filling the space between the first and second substrates with the ionizable gas. The purification step may comprise a dry etching, a wet etching, a mechanical working, an aging of the discharge electrodes by applying voltage to the electrodes under an atmosphere of formation gas, or processing the discharge electrode using at least one of hydrogen peroxide aqueous solution, ethylene glycol, or water. The baking step may comprise printing a conductive paste, printing an insulating paste on the conductive paste, and then baking the conductive and insulating paste simultaneously to thereby form the discharge electrode having a barrier rib thereon.

By the manufacturing method, the discharge chamber of the present invention having such advantages as described above can be manufactured readily.

According to a further aspect of the present invention, there is provided a plasma addressed display device, which comprises a display chamber having a plurality of signal electrodes arranged in parallel to each other, and a discharge chamber, associated with the display chamber, having a plurality of discharge electrodes, at least one of the discharge electrodes having a purified surface from which impurities of insulating material are removed to have a flat depth profile. Preferably, the discharge chamber has a plurality of barrier ribs so that one of the barrier ribs are stacked with a part of the corresponding discharge electrode, whereby an exposed surface of the discharge electrodes has the purified surface. The the discharge electrodes and barrier ribs may be formed by printing and baking procedures.

With the plasma addressed display device, since the discharge chamber of the present invention having such advantages as described above is incorporated, a high picture quality is assured and a high driving efficiency is assured.

The above and other objects, features and advantages of the present invention will become apparent from the following description and the appended claims, taken in conjunction with the accompanying drawings in which like parts or elements are denoted by like reference characters.

DESCRIPTION OF THE PREFERRED EMBODIMENT

Figure 1:
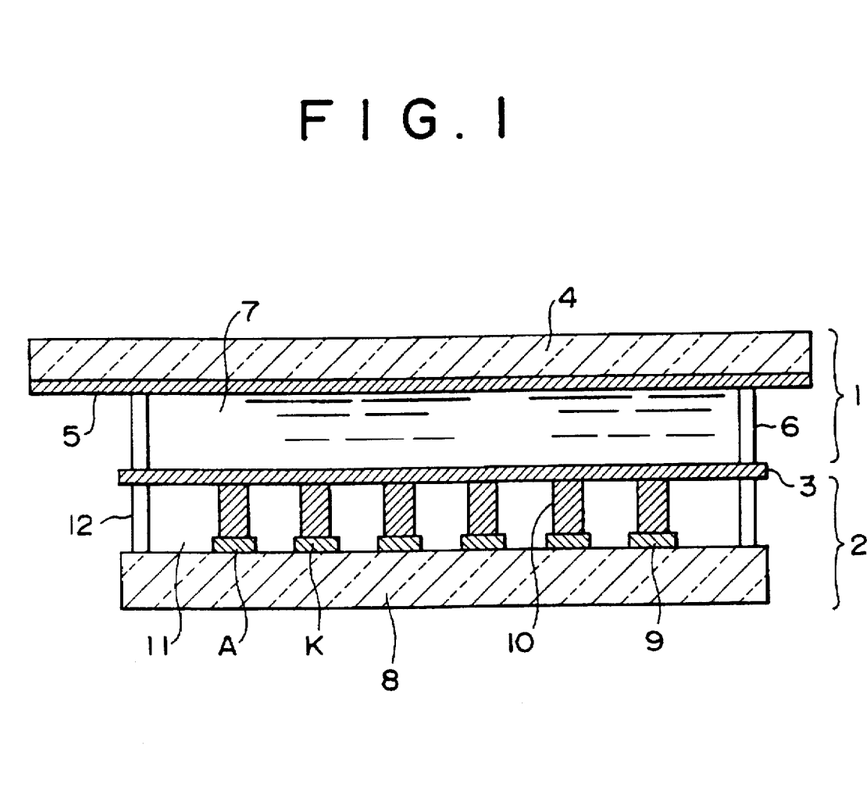
FIG. 1 is a schematic sectional view showing a plasma addressed liquid crystal display device in which a discharge chamber according to the present invention is incorporated.

Referring first to FIG. 1, there is shown a plasma addressed liquid crystal display device in which a discharge chamber according to the present invention is incorporated. The plasma addressed liquid crystal display device shown has a flat panel structure wherein a liquid crystal cell 1, a discharge chamber 2, and an intermediate substrate 3 formed from a very thin dielectric sheet are layered with each other with the intermediate substrate 3 interposed between the liquid crystal cell 1 and the discharge chamber 2. The liquid crystal cell 1 is constructed using an upper side glass substrate 4, and a plurality of signal electrodes 5 made of a transparent conductive film are formed on an inner side major surface of the liquid crystal cell 1 such that they extend in parallel to each other in the direction of a column of a matrix. The glass substrate 4 is adhered to the intermediate substrate 3 with a predetermined gap left therebetween by means of a spacer 6. A liquid crystal layer 7 is filled and enclosed in the gap.

Meanwhile, the discharge chamber 2 is constructed using a lower side glass substrate 8. A plurality of discharge electrodes 9 are formed on an inner side major surface of the glass substrate 8 in the direction of a row of the matrix. The discharge electrodes 9 alternately serve as an anode A and a cathode K and produce plasma discharge. Further, a barrier rib 10 is formed on and along each of the discharge electrodes 9 such that it may overlap with part of the discharge electrode 9. The barrier ribs 10 contact at top ends thereof with the intermediate substrate 3 and serve also as a spacer. The glass substrate 8 is adhered to the intermediate substrate 3 using a seal member 12. An airtight enclosed space 11 is formed between the glass substrate 8 and the intermediate substrate 3. The space 11 is sectioned or partitioned by the barrier ribs 10 to construct discharge regions which individually make row scanning units. Ionizable gas is enclosed in the inside of the airtight space 11. The type of the gas can be selected from, for example, helium, neon, argon or any mixture of the gases.

As a characteristic of the discharge chamber according to the present invention, each of the discharge electrodes 9 has a clean or purified surface from which impurities of insulating substances have been removed and has a uniform composition in both of a horizontal direction and a depthwise direction. More particularly, insulating substances have been removed from a portion of the surface region of each of the discharge electrodes 9 at which the surface region is not covered with any barrier rib 10, that is, an exposed portion of the surface region. It is to be noted that the present invention is not limited to the specific arrangement, and even where no barrier rib is formed, it can contribute to stabilization of discharge to purify the surfaces of discharge electrodes to remove impurities of insulating substances present on the surfaces of the discharge electrodes by some reason. By removing insulating substances from the surfaces of the discharge electrodes to expose the metal-rich surfaces of the discharge electrodes in this manner, the discharge electrodes thus produced have no difference in composition between the surfaces and the insides of the discharge electrodes, and consequently, remarkable improvement in discharging condition can be achieved. For example, when a conductive paste which contains, for example, $Ni_2B$ as a principal component is printed and baked to produce discharge electrodes, by performing purifying processing, the electrode structure thus produced has a depth profile by the AES which presents no difference in the depthwise direction in composition ratio of principal components such as Ni, O and B at any portion of each electrode. It is to be noted that the discharge chamber which includes such discharge electrodes as described just above can be applied not only to such a plasma addressed liquid crystal display device as described above but also to popular plasma display panels and like apparatus.

Figure 2:
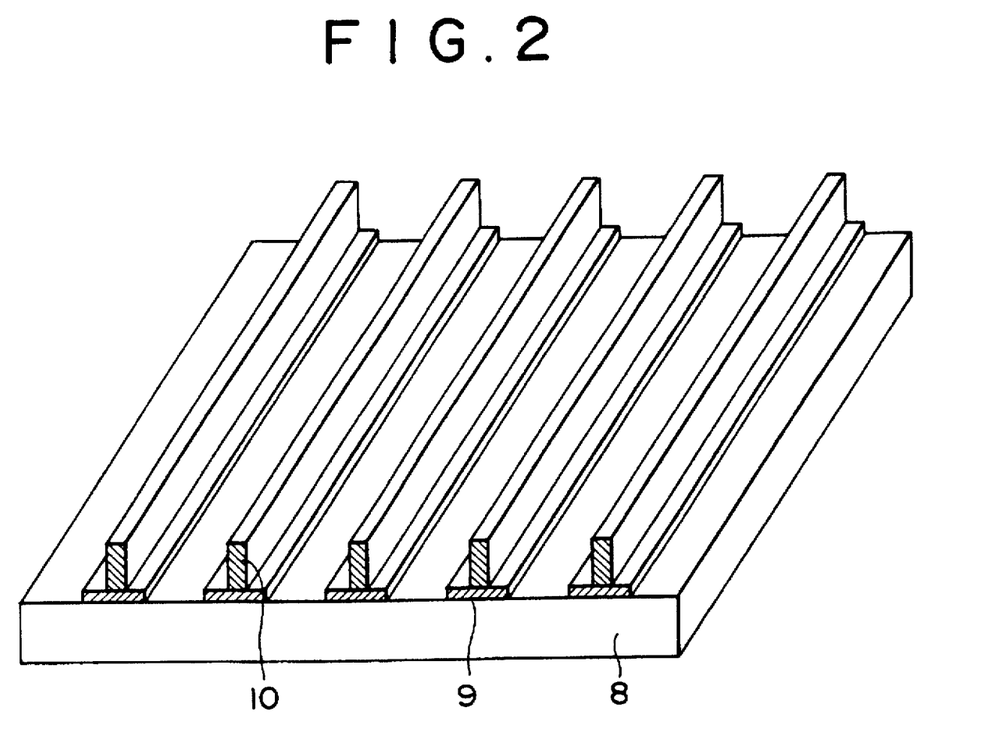
FIG. 2 is a schematic perspective view showing a discharge electrode pattern of the discharge chamber according to the present invention.

FIG. 2 is a schematic perspective view showing a surface pattern configuration of the glass substrate 8 shown in FIG. 1. A plurality of discharge electrodes 9 are formed in a striped pattern on the surface of the glass substrate 8. The discharge electrodes 9 are arranged in a spaced relationship by a predetermined pitch, and the individual stripes thereof have a predetermined width dimension. The discharge electrodes 9 can be produced by applying a conductive paste, which contains, for example, $Ni_2B$ as a principal component and kneaded with a binder and a solvent, by screen printing and baking the thus applied conductive paste at a high temperature. A barrier rib 10 is formed on each of the discharge electrodes 9. Also the barrier ribs 10 are formed in a pattern of stripes having the same pitch as that of the discharge electrodes 9. The stripes of the barrier ribs 10 have a width dimension smaller than the stripe width dimension of the discharge electrodes 9 and are arranged in alignment with the discharge electrodes 9. The barrier ribs 10 can be formed by applying an insulating paste such as, for example, a glass paste by screen printing and baking the thus applied insulating paste at a high temperature. In the present embodiment, after a conductive paste is printed and then provisionally baked at a comparatively low temperature, an insulating paste is printed in an overlapping relationship. Since no high temperature processing is interposed between the two printing steps, no thermal shrinkage of the glass substrate 8 occurs, and consequently, it is possible to effect printing alignment accurately. After such overlapping printing, high temperature baking processing (about 600° C.) is performed to simultaneously harden the discharge electrodes 9 and the barrier ribs 10 regularly. In this instance, the exposed portions of the discharge electrodes 9 are soiled upon high temperature heating so that oxide insulating substances such as $B_2O_3$ are produced on the surfaces of the discharge electrodes 9. Accordingly, if this condition is left as it is, then stable plasma discharge cannot be obtained on the discharge chamber. Taking this into consideration, in the present invention, the glass substrate shown in FIG. 2 is processed by purification to remove such insulating substances on the surfaces of the discharge electrodes 9. It is to be noted that, if an insulating paste is printed and then processed by high temperature baking processing again after a conductive paste is baked at a high temperature, then formation of insulating substances on the surfaces of the discharge electrodes 9 can be restricted to some degree. However, where high temperature baking is performed twice separately, then the glass substrate 8 undergoes thermal shrinkage, and consequently, it is impossible to achieve accurate alignment of a screen printing mask. In addition, even when high temperature baking processing is performed twice separately, insulating substances are sometimes produced to some degree, and the purifying processing according to the present invention is effective also in this instance.

Figure 3:
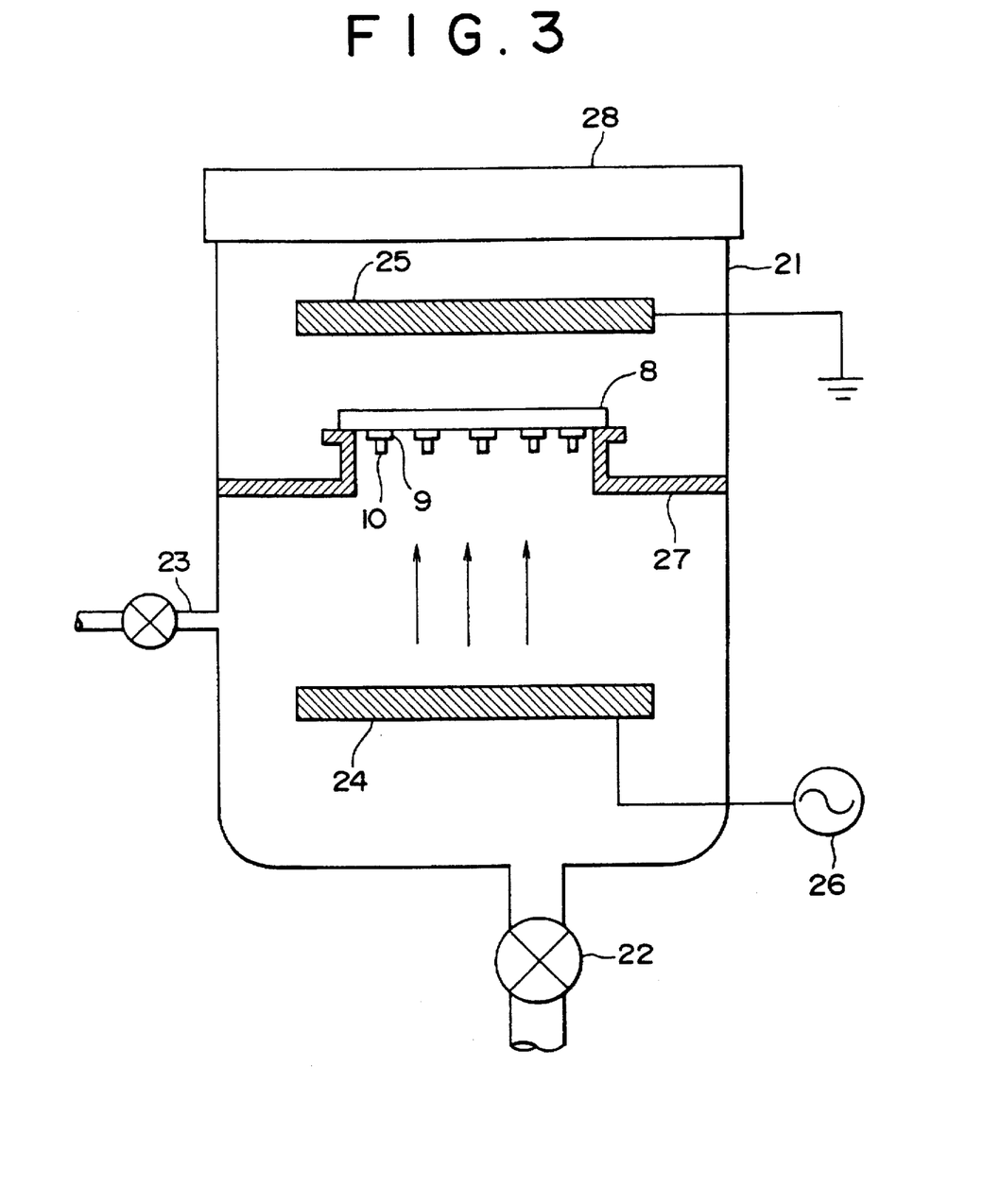
FIG. 3 is a schematic diagram showing a processing apparatus used for sputter etching for discharge electrodes.

In order to remove insulating substances on the surfaces of discharge electrodes, various methods may be available. For example, insulating substances on the surfaces of discharge electrodes can be removed by sputter etching, and FIG. 3 shows an apparatus for use for such sputter etching. Referring to FIG. 3, the plasma etching apparatus shown includes a substantially cylindrical vacuum chamber 21. Air can be discharged from the vacuum chamber 21 by way of a valve 22 by means of a vacuum pump (not shown) to put the vacuum chamber 21 into a vacuum condition. Meanwhile, a desired gas (for example, argon) can be introduced into the vacuum chamber 21 by way of a gas entrance 23. A pair of electrode plates 24 and 25 are accommodated in the vacuum chamber 21 and arranged in an opposing relationship to each other. An RF power source 26 is connected to the lower side electrode plate 24 while the upper side electrode plate 25 is connected to a predetermined bias potential. Argon is introduced into the vacuum chamber 21 by way of the gas entrance 23, and plasma is produced between the electrodes 24 and 25 in pair by the RF power source 26 to perform sputter etching processing of the glass substrate 8 placed on a support 27. It is to be noted that the discharge electrodes 9 and the barrier ribs 10 are formed on the glass substrate 8 by printing and baking as described hereinabove.

A detailed sputter etching method will be described subsequently with continuous reference to FIG. 3. First, a lid 28 provided at an upper portion of the vacuum chamber 21 is opened, and the glass substrate 8 is put into the inside of the vacuum chamber 21 and placed onto the support 27. The discharge electrodes 9 and the barrier ribs 10 are formed by printing and baking on the surface of the glass substrate 8. Then, air is discharged from the vacuum chamber 21 until the pressure in the vacuum chamber 21 becomes very low. Subsequently, argon is introduced into the chamber 21 by way of the gas entrance 23 until the internal pressure becomes approximately 3 mmTorr. In this condition, a high frequency voltage is applied between the electrode plates 24 and 25 in pair with the power of approximately 1 kW from the RF power source 26 to cause discharge plasma including argon ions to be produced in the chamber 21. The exposed surfaces of the discharge electrodes 9 are sputter etched by the argon ions contained in the plasma. By performing such sputtering, for example, for about 45 minutes, the surfaces of the discharge electrodes 9 are etched by approximately several hundreds nm so that insulating substances on the surfaces are removed. Consequently, even where incomplete discharge occurs with a conventional discharge chamber, discharge occurs very uniformly with the discharge chamber of the present invention. Further, if the surfaces of the discharge electrodes are etched to the depth at which the Ni composition is saturated, the unevenness over the entire discharge chamber is eliminated, and consequently, even with the discharge chamber wherein the discharge electrodes and the barrier ribs are formed separately by high temperature baking, discharge occurs uniformly comparing with a conventional discharge chamber. It is to be noted that, where argon sputter etching is employed, uniform surface cleaning can be performed without damaging the glass substrate itself.

The purification processing by sputter etching described above is a mere example, and various other means can be adopted. For example, plasma of an inactive gas such as hydrogen or $SF_6$ is used to act upon the surfaces of discharge electrodes to dissolve and remove insulating substances. This method can be performed substantially in a similar manner as in the sputter etching described above. Further, insulating substances on the surfaces of discharge electrodes can be removed mechanically by sandblasting or polishing. Or, it is also possible to chemically remove insulating substances on the surfaces of discharge electrodes by wet etching. However, the mechanical polishing or wet etching may possibly damage the discharge electrodes, the barrier ribs and the glass substrate depending upon conditions. Further, it is possible to apply a voltage to discharge electrodes themselves in a predetermined formation gas (for example, Ar, H) atmosphere to effect aging to remove insulating substances. However, where the discharge electrodes are originally in a non-uniformly finished condition due to insulating substances sticking to the surfaces of them, portions of the discharge electrodes which do not discharge well are not etched appropriately, resulting in inferiority in uniformity.

Purified surfaces can be obtained also by processing discharge electrodes after baking with one of hydrogen peroxide aqueous solution, ethylene glycol and water. Where this method is employed, discharge electrodes in the present invention can be obtained without using a large size vacuum apparatus.

The cause of incomplete discharge is insulating oxides existing on the surfaces of electrodes. Where hydrogen peroxide aqueous solution is used for the purification processing, insulating oxides are reduced, or made soluble, and dissolved. Further, hydrogen peroxide aqueous solution reduces and dissolves only insulating dioxides but does not resolve the metal itself which is the material of the discharge electrodes. Accordingly, even if the solution penetrates into the inside of printed electrodes or into interfaces between the discharge electrodes and the glass substrate, this does not raise such problem that the electrodes are damaged or peeled off.

When purification processing is performed with hydrogen peroxide aqueous solution, such hydrogen peroxide aqueous solution having the concentration of approximately 30 to 35% as is marketed for the electronic industry may be used as is.

The purification processing with ethylene glycol or water is a method which is effective for discharge electrodes of nickel. While discharge electrodes of nickel are usually produced using a conductive paste which contains $Ni_2B$ as a principal component, if they are baked after printing, then insulating substances wherein $B_2O_3$ is a principal component are segregated on the surfaces of the discharge electrodes and make a cause of incomplete discharge. However, since $B_2O_3$ is soluble into ethylene glycol, if the discharge electrodes are processed with ethylene glycol, then most of the insulating substances can be removed, and consequently, good discharge can be obtained. On the other hand, if purification processing is performed with water, then since $B_2O_3$ are solved in accordance with reaction formulae (1) and (2) given below, similar effects as those achieved when purification processing is performed with ethylene glycol can be achieved.

$$B_2O_3 + H_2O \rightarrow 2HBO_2 \quad (1)$$

$$HBO_2 + H_2O \rightarrow B(OH)_3 \quad (2)$$

Since any of ethylene glycol and water dissolve only $B_2O_3$ but does not dissolve Ni, no problems such as the electrodes being damaged or being peeled off occurs. When water is used for purification processing, since the solubility for $B_2O_3$ increases as the temperature rises, preferably the water temperature is set higher than room temperature (25° C.).

Where the discharge electrodes are made of nickel, it is more effective to process them with hydrogen peroxide aqueous solution after processing with ethylene glycol than to process them with hydrogen peroxide aqueous solution or ethylene glycol by itself. The reason why the former purification processing is more effective than the latter purification processing with hydrogen peroxide aqueous solution by itself is that ethylene glycol dissolve $B_2O_3$ a higher rate than hydrogen peroxide aqueous solution. Further, the reason why the former purification processing is more effective than the latter purification processing with ethylene glycol by itself is that insulating oxides other than $B_2O_3$ such as NiO which cannot be removed with the former process with ethylene glycol can be removed.

The method of processing electrodes with hydrogen peroxide aqueous solution or water may be a method wherein a substrate on which the electrodes are formed is immersed into hydrogen peroxide aqueous solution or water, method wherein the electrodes are subjected to a shower of hydrogen peroxide aqueous solution or water, or some other method. Any method may be available only if a sufficient contact time is assured between the hydrogen peroxide aqueous solution or water and the electrodes.

While the processing time must necessarily be optimized depending upon electrode baking conditions, the concentration of the hydrogen peroxide aqueous solution and the water temperature, it is preferably one minute to two hours or more preferably 5 minutes to one hour. If the processing time is too short, then a sufficient effect cannot be obtained, but if the processing time is excessively long, then this is not preferable from the point of view of productivity.

In the following, several examples will be described in detail. First, a substrate of the structure shown in FIG. 2 was manufactured in the following procedure.

1. A nickel paste 9535M by DuPont is applied by printing to a glass substrate and then dried at 150° C.
2. A glass paste ELD-511 by Okuno Seiyaku is applied by printing onto the nickel paste and then dried at 150° C.
3. The substrate produced in such a manner as described above is placed into a nitrogen atmosphere and baked at 580° C.

EXAMPLE 1

The substrate thus obtained was immersed for 15 minutes in hydrogen peroxide aqueous solution (30 to 35% in concentration, special grade by Kanto Kagaku) and then washed with water and dried to obtain such a PALC (plasma addressed liquid crystal) panel as shown in FIG. 1. The panel exhibited good stability and uniformity of discharge, and the discharge starting voltage was 220 V and the discharge keeping voltage was 270 V. No peeling off of the electrodes occurred.

EXAMPLE 2

The substrate was immersed for 5 minutes in ethylene glycol (special grade by Kanto Kagaku) and then washed with water and dried to produce a panel. The panel exhibited good stability and uniformity of discharge, and the discharge starting voltage was 225 V and the discharge keeping voltage was 290 V. No peeling off of the electrodes occurred.

EXAMPLE 3

The substrate was immersed for 5 minutes in warm water of 40° C. and then washed with water and dried to produce a panel. The panel exhibited good stability and uniformity of discharge, and the discharge starting voltage was 225 V and the discharge keeping voltage was 300 V. No peeling off of the electrodes occurred.

EXAMPLE 4

The substrate was immersed for 5 minutes in ethylene glycol and immersed for 2 minutes in hydrogen peroxide aqueous solution (30 to 35% in concentration, by Kanto Kagaku), whereafter it was washed with water and dried to produce a panel. The panel exhibited good stability and uniformity of discharge, and the discharge starting voltage was 210 V and the discharge keeping voltage was 260 V. No peeling off of the electrodes occurred.

COMPARATIVE EXAMPLE 1

A panel was produced from the substrate without processing the substrate with hydrogen peroxide aqueous solution or warm water and tested to produce plasma discharge. However, no plasma discharge was produced.

COMPARATIVE EXAMPLE 2

The substrate was processed with an acid solution of nitric acid:acetic acid:water=1:1:2, which is a typical etchant for nickel. Peeling off of an electrode was observed.

Thus, the method described above is advantageous in that purification of electrodes can be performed without using a vacuum apparatus, and that a discharge chamber which is superior in discharge characteristic can be manufactured at a high productivity.

In a discharge chamber for which purification processing has been performed by such various methods as described above, very uniform plasma discharge can be obtained. Further, since insulating substances on the surfaces of the discharge electrodes have been removed, the discharge starting voltage is lowered, which is advantageous in operation. Further, since a voltage drop which may otherwise be caused by insulating substances is not present, the offset between the anode potential of the discharge electrodes and the plasma potential is reduced, which is convenient for driving of the discharge chamber. If an offset is involved otherwise, where the discharge chamber is incorporated in a plasma addressed liquid crystal display device, some trouble is produced in ac driving of the liquid crystal cell side. Although the plasma potential in the discharge chamber becomes near to the anode potential side, they do not become completely equal to each other due to the offset. The offset amount is not fixed but presents some variation. Accordingly, even if a reference potential is set taking a predetermined offset amount into consideration in advance and then the liquid crystal is driven by ac driving, actually a dc component is included in the ac driving signal, which causes a deterioration of the liquid crystal. Accordingly, removal of the offset to the utmost is preferable for maintenance of ac driving. Further, according to the present invention, simultaneous high temperature baking of discharge electrodes and barrier ribs is made possible, and accordingly, there is an advantage in that aging which is conventionally performed in order to achieve stabilization after assembly of a discharge chamber can be eliminated.

Figure 7:
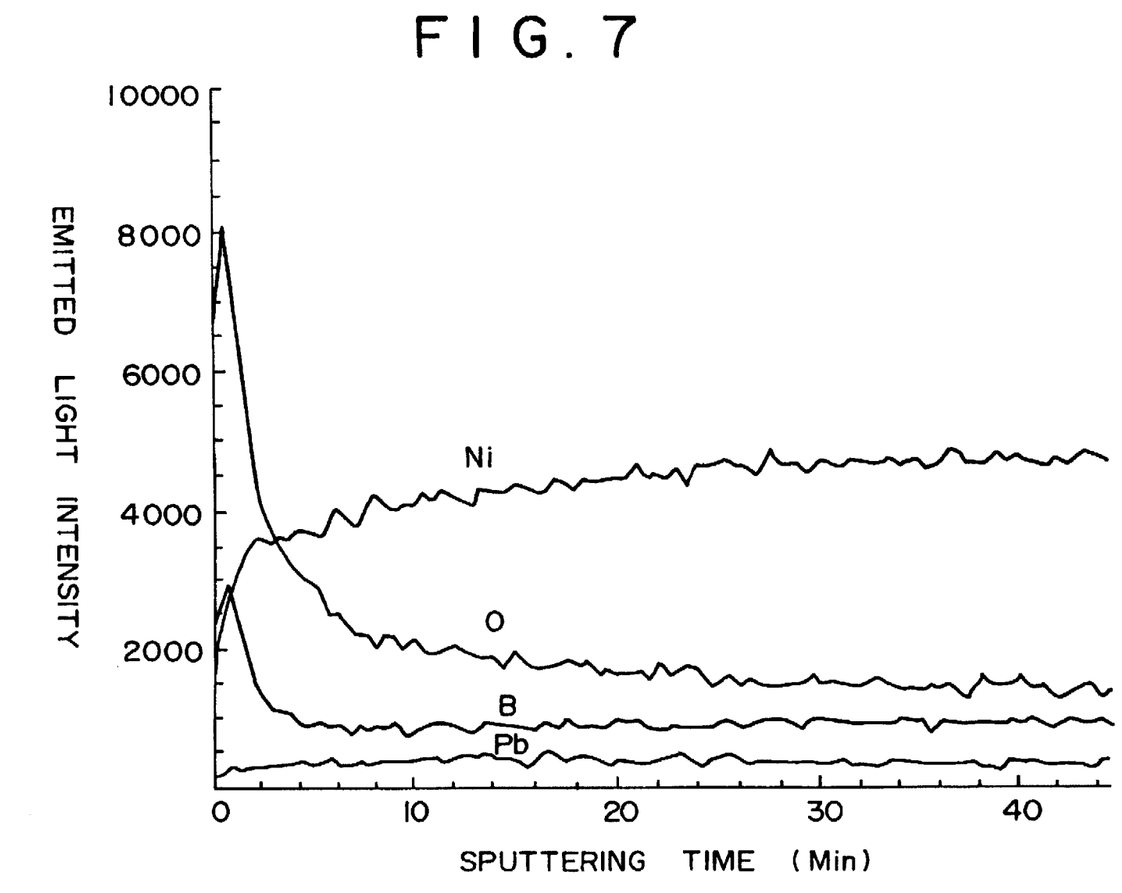
FIG. 7 is a similar view but showing an AES depth profile of a discharge electrode formed on a discharge chamber according to the present invention; and PIG. 8 is a graph illustrating the composition of a discharge chamber according to the present invention.
Figure 8:
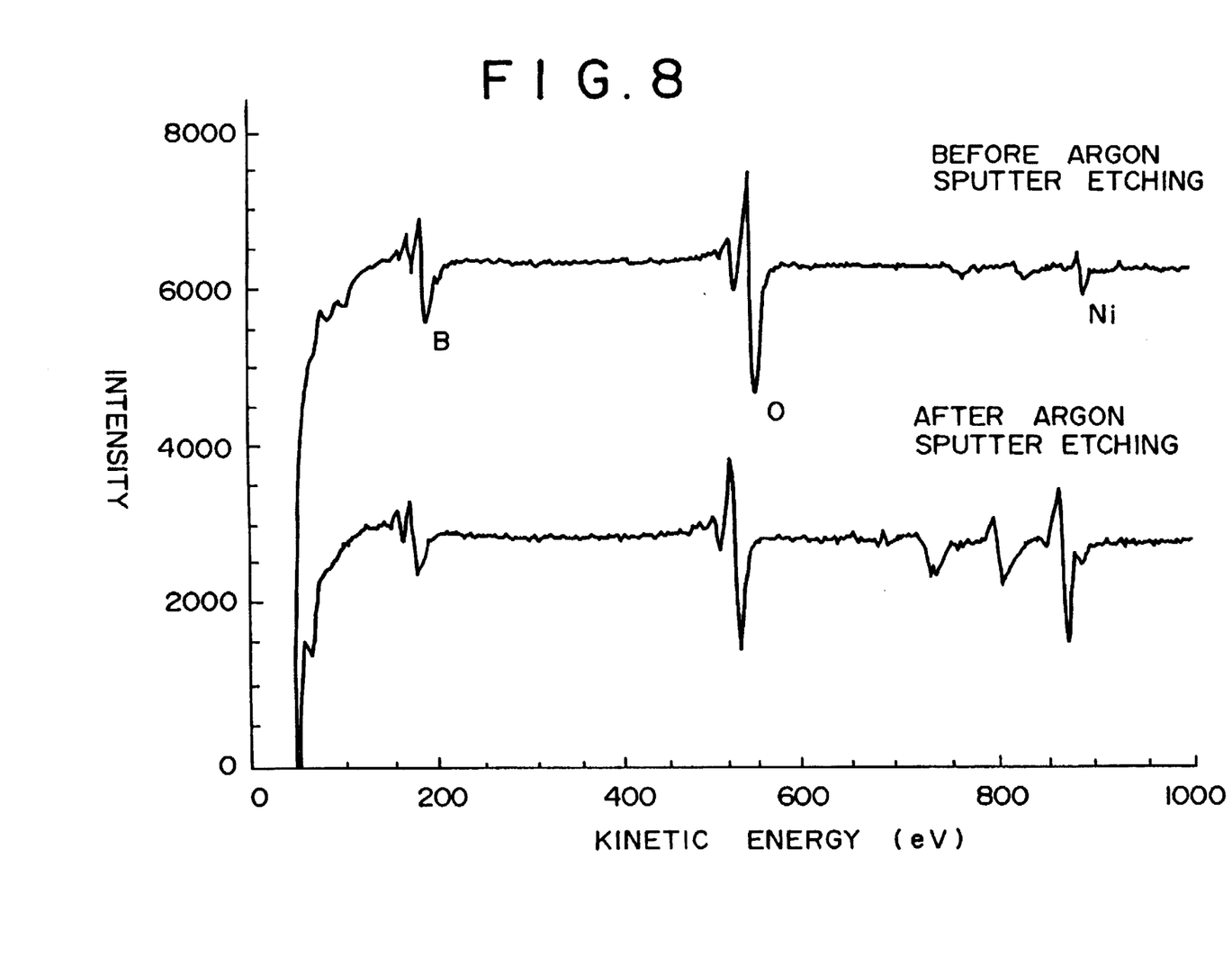

The subject matter of the present invention resides in production of discharge electrodes which present no difference in composition between the surfaces and the insides thereof. In other words, the subject matter is to produce discharge electrodes wherein substantially no insulating substance are present on the surfaces thereof and the surfaces are rich with a metal component such as Ni. For example, the subject matter is to produce discharge electrodes which do not, for example, in an AES depth profile, present a difference in a depthwise direction in the ratio of composition of components such as Ni, B and O (an electrode structure having a flat depth profile). One effective means for such production is sputter retching with argon. FIG. 7 shows an AES depth profile of a discharge electrode after argon sputter etching. As apparently seen from comparison with another AES depth profile of a case before argon sputter etching shown in FIG. 6, only an insulating substance can be observed on the surface of the discharge electrode, and a substantially clean electrode surface was obtained. Meanwhile, FIG. 8 illustrates intensity peak variations of several components before and after argon sputter etching. A discharge electrode surface composition wherein the peak of a Ni component is increased so that the discharge electrode surface is rich with a metal component was obtained.

Having now fully described the invention, it will be apparent to one of ordinary skill in the art that many changes and modifications can be made thereto without departing from the spirit and scope of the invention as set forth herein.

What is claimed is:

1. A method of manufacturing a discharge chamber for a plasma addressed display which comprises first and second substrates defining therebetween a space filled with an ionizable gas, comprising the steps of:

forming a plurality of discharge electrodes on a surface of a substrate by a printing procedure;

baking the discharge electrodes at a first baking temperature;

applying insulator paste for forming a plurality of barrier ribs;

baking the discharge electrodes and the barrier ribs at a second baking temperature which is higher than the first baking temperature;

purifying a surface of the discharge electrodes by removing impurities of electrically insulating material comprising metal oxides from the electrode surface; and filling the space between the first and second substrates with the ionizable gas.

2. A method of manufacturing a discharge chamber as claimed in claim 1, wherein said purification step comprises a dry etching.

3. A method of manufacturing a discharge chamber as claimed in claim 1, wherein said purification step comprises a wet etching.

4. A method of manufacturing a discharge chamber as claimed in claim 1, wherein said purification step comprises a mechanical working.

5. A method of manufacturing a discharge chamber as claimed in claim 1, wherein said purification step comprises an aging of the discharge electrodes by applying voltage to the electrodes under an atmosphere of formation gas.

6. A method of manufacturing a discharge chamber as claimed in claim 1, wherein said purification step comprises processing the discharge electrode using at least one of hydrogen peroxide aqueous solution, ethylene glycol, or water.

7. A method of manufacturing a discharge chamber as claimed in claim 1, wherein said baking step comprises printing a conductive paste, printing an insulating paste on the conductive paste, and then baking the conductive and insulating paste simultaneously to thereby form the discharge electrode having a barrier rib thereon.

8. A method as claimed in claim 1, wherein said discharge electrodes is of a material that is at least 50% $Ni_2B$.

9. A method as claimed in claim 1, wherein said metallic oxides is of a material that is at least 50% $B_2O_2$.

* * * * *